B. W. JOHNSON.
GOVERNOR.
No. 174,254. Patented Feb. 29, 1876.
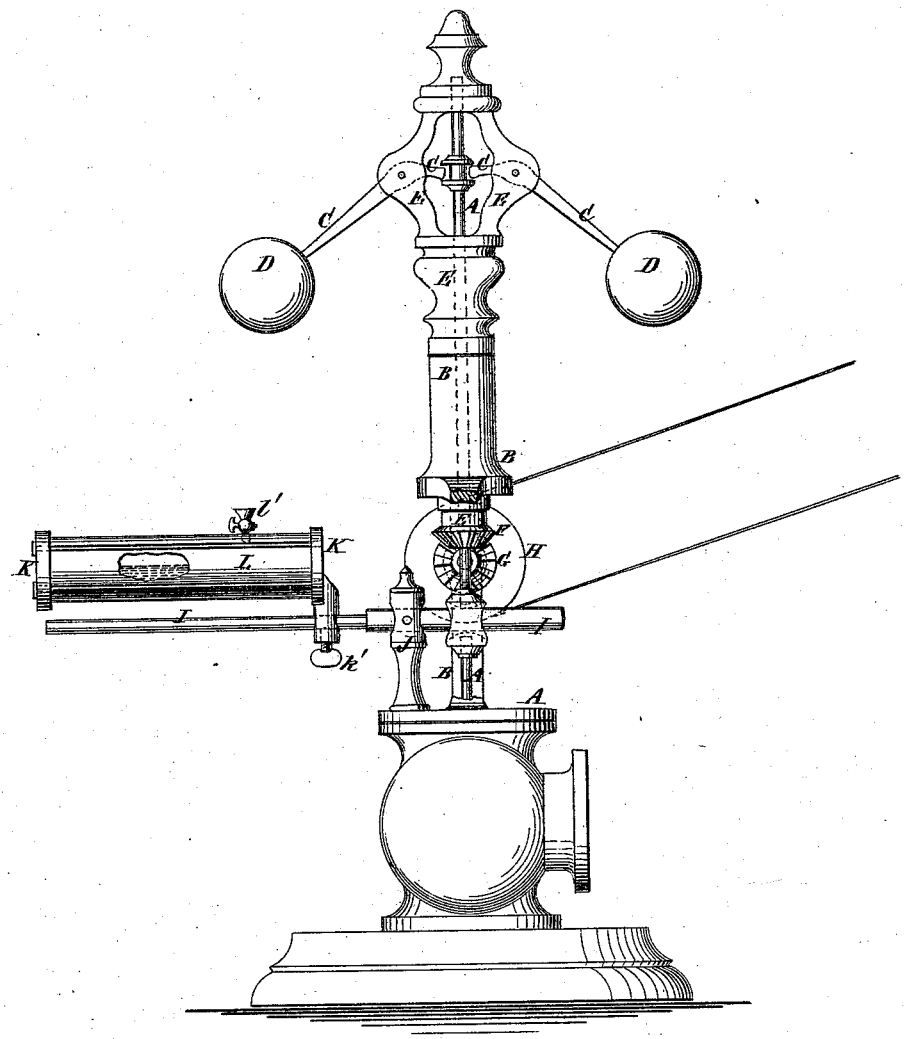
WITNESSES:
A. W. Almqvist
Alex F. Roberts
INVENTOR:
B. W. Johnson
BY
ATTORNEYS.

UNITED STATES PATENT OFFICE.

BERNARD W. JOHNSON, OF BARRY, ILLINOIS, ASSIGNOR TO HIMSELF, JOSEPH D. PARTELLO, AND JOHN M. RYAN, OF SAME PLACE, AND MILLER T. GREENLEAF, OF QUINCY, ILLINOIS.

IMPROVEMENT IN GOVERNORS.

Specification forming part of Letters Patent No. 174,254, dated February 29, 1876; application filed December 27, 1875.

*To all whom it may concern:*

Be it known that I, BERNARD W. JOHNSON, of Barry, in the county of Pike and State of Illinois, have invented a new and useful Improvement in Governors, of which the following is a specification:

The figure is a side view of my improved governor.

The object of this invention is to furnish an improved governor, which shall be provided with a varying leverage, which will keep the engine to its proper speed as machinery is thrown into or out of gear with it without its being necessary to adjust the balls upon their levers.

The invention consists in the combination of the lever, the adjustable cage or frame, and the cylinder for mercury or other suitable fluid with the valve-stem of an ordinary ball-governor, as hereinafter fully described.

A is the stem of the governor-valve, which passes up through the frame or stand B, and has a ring-groove in its upper end to receive the inner ends of the levers C, to the outer ends of which the balls D are attached. The levers C are pivoted to the upper part of the sleeve E, which passes down through the stand B, and through which the valve-stem A passes. To the lower end of the sleeve E is attached a small bevel-gear wheel, F, the teeth of which mesh into the teeth of a small bevel-gear wheel, G, attached to the inner journal of the pulley H, that receives the belt from the engine to give motion to the governor. In the lower part of the valve-stem A is formed an enlargement, having a slot formed through it, through which passes the inner ends of the lever I. The lever I is pivoted to a stud, J, attached to the stand B or some other suitable support. The lever I passes through a lug formed upon the frame or cage K, where it is secured in place adjustably by a set-screw, k'. In the frame or cage K is inclosed a glass cylinder, L, which is designed to be about half filled with mercury or any other suitable fluid. The mercury or other suitable fluid is poured in through a funnel-cock, l', in the upper side of the cylinder L.

The governor should be so adjusted that the cylinder L may be in a horizontal position when the governor is running at its proper speed, with about half the machinery to be driven in gear with the engine. If, now, some of the machinery is thrown out of gear with the engine, the rise of the balls D tends to close the valve, and also raises the outer end of the cylinder L. This causes the mercury or other fluid to flow toward the inner end of said cylinder, and changes the leverage, so that the engine does not have to keep up its speed to keep the valve closed. If, on the other hand, more machinery is thrown into gear with the engine, the speed is lessened, the balls D lower, and the outer end of the cylinder L is lowered, causing the mercury or other fluid to flow toward the outer end of said cylinder, giving more leverage against the centrifugal force of the balls D, and bringing the engine to its proper speed quicker than the balls could do alone without the balls being moved by hand upon their levers.

The advantage of making the cylinder L adjustable on the lever I is that it may be moved more or less close up to the shoulder of lever. At the latter point the slowest motion is obtained, while an increase of greater or less magnitude may be had by moving it out toward the end of lever.

The leverage works against the centrifugal force so as to produce an augmentation of the valve-opening, which adds to the speed.

The mercury-tube can be adjusted to any lever-governor, or one without a lever.

What I claim is—

The combination, with governor having slotted valve-stem A, of the lever I, pivoted to stud J, the adjustable cage K, and cylinder L, as and for the purpose specified.

BERNARD W. JOHNSON.

Witnesses:
 D. W. GREENE,
 A. C. LAING.